United States Patent Office 3,206,483
Patented Sept. 14, 1965

3,206,483
1,4 - DI - (POLYALKYLPHENYLAMINO)ANTHRA-QUINONE CONTAINING A SULFATOACETA-MIDOMETHYL SUBSTITUENT
Jacques Guenthard, Binningen, Basel-Land, Wolfgang Schoenauer, Riehen, and François Benguerel, Basel, Switzerland, assignors to Sandoz Ltd., Basel, Switzerland
No Drawing. Filed Jan. 22, 1962, Ser. No. 167,971
4 Claims. (Cl. 260—377)

This invention relates to a process for the production of dyes which contain, combined to a carbon atom, at least one group of the formula $$HO_3S—O—R—CO—NH—CH_2—\quad (I)$$

wherein R represents a substituted or unsubstituted aliphatic, aliphatic-aromatic or aliphatic-cyclo aliphatic radical which may contain hetero atoms.

In this formula —O—R—CO— may have, for example, one of the following meanings:

—O—CH₂—CH₂—CO—
—O—CH₂—CH₂—NH—CH₂—CO—
—O—CH₂—CH₂—NH—CH₂—CH₂—CO—

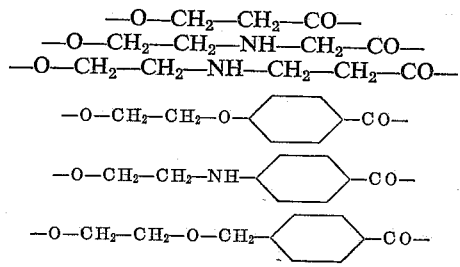

or

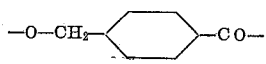

but it is preferably —O—CH₂—CO—.

The process for the production of the dyes is characterized by the reaction of dyes having exchangeable hydrogen atoms bound to aromatic nuclei, or organic compounds having exchangeable hydrogen atoms bound to aromatic nuclei and in addition at least one substituent permitting dye formation, with a compound of the formula $$X—R—CO—NH—CH_2—OH \quad (II)$$

wherein
R represents a substituted or unsubstituted aliphatic, aliphatic-aromatic or aliphatic-cycloaliphatic radical which may contain hetero atoms, and
X represents —OH or —OSO₃H, and by the conversion of the reaction products into dyes when these products contain radicals of organic compounds having substituents permitting dye formation, or into their sulfuric acid esters when X stands for —OH, the two reactions being carried out in either order as desired.

The process of the invention permits the production of dyes in which the compound of the Formula II can be replaced by an equivalent mixture of a compound of the formula $$X—R—CO—NH_2 \quad (III)$$

and a symmetrical dihalogenodimethyl ether.

The preferred dyes in which a compound of the Formula II or an equivalent mixture of a compound of the Formula III and a symmetrical dihalogenodimethyl ether occur at least once, are the dyes of the anthraquinone series, and of these the preferred dyes are the anthraquinone dyes in which the chain member R is the methylene group.

The following may be enumerated as examples of dyes possessing exchangeable hydrogen atoms: 1-amino-4-arylaminoanthraquinones such as 1-amino-4-phenylaminoanthraquinone-2-sulfonic acid, and its derivatives substituted in the phenylamino radical by methyl, ethyl, methoxy, ethoxy, chlorine or bromine, such as 1-amino-4-(2',4'-dimethyl)-, -4-(2',6'-dimethyl)-, 4-(2',4',6'-trimethyl)-phenylaminoanthraquinone-2-sulfonic acid, 1,4-diarylaminoanthraquinones and their sulfonic acids such as 1,4-di-(4'-methyl)- or -4'-methyl-2'-sulfo-phenylaminoanthraquinone, 1,4-di-(2',4',6'-trimethyl)- or -(2',4',6'-trimethyl-3'-sulfo)-phenylaminoanthraquinone, 1-amino-2-aryloxy-4-arylaminoanthraquinones such as 1-amino-2-(4'-octyl)-phenoxy - 4 - (2'',4'',6'' - trimethyl) - phenylaminoanthraquinone and its sulfonic acids, in which the anthraquinone nucleus may be further substituted.

The reaction is carried out in an acid medium, preferably in sulfuric acid solution, e.g. 80 to 100% sulfuric acid, at temperatures of 0° to about 60° C. for several hours.

The reaction products, when they contain no acid sulfate group, are either sulfated in the reaction medium itself by the addition of concentrated oleum until a 100% sulfuric acid or a weak oleum is formed, or they are first isolated, e.g. by being run into ice and water, filtered off, washed neutral with dilute brine and dried with vacuum, and then sulfated in 100% sulfuric acid or weak oleum. The sulfating mixture is discharged onto ice and water or into brine; on which the sulfuric acid ester is salted out, filtered with suction, washed neutral with brine and dried.

The compounds of Formula II can be obtained from the corresponding carboxylic acid amides of Formula III by condensation with aldehydes, preferably formaldehyde, or with a symmetrical dihalogenodimethyl ether in neutral to weakly alkaline aqueous solution or suspension at room temperature or a higher temperature and in presence of a catalyst, e.g. trimethyl- or triethylamine.

The dyes obtained dye wool, silk, synthetic polyamide fibers, leather and fibers of neutral and regenerated cellulose by exhaustion dyeing, padding and printing processes in shades which are fast to light and wet treatments, of good fastness to milling, water, sea water, washing, perspiration, crocking and of very good fastness to dry cleaning. The introduction of at least one group of Formula II or of an equivalent mixture of a compound of Formula III and a symmetrical dihalogenodimethyl ether improves the milling fastness in particular while leaving the light and other wet fastness properties unaffected.

In the following examples the parts and percentages are by weight and the temperatures in degrees centigrade.

EXAMPLE 1

4.7 parts of the condensation product of 1 mol of 1,4-diaminoanthraquinone and 2 moles of 1-bromo-2,4,6-trimethylbenzene are dissolved in 74 parts of 96% sulfuric acid at 20°, then 2.2 parts of N-methylol-hydroxyacetamide are added with stirring at 10–15°. The mixture is stirred for 24 hours at 15–20° and then run onto ice. The precipitated dye is isolated, washed with a 10% sodium chloride solution until neutral and dried. The dye is obtained as a blue powder which dyes wool in full blue shades of very good fastness to washing and to acid and alkaline milling.

The dyeings on wool are considerably faster to milling than dyeings produced with the sulfonation product of 1,4-di-(2',4',6'-trimethyl)-phenylaminoanthraquinone.

EXAMPLE 2

5 parts of the condensation product of 1 mol of 1,4-diaminoanthraquinone and 2 mols of 1-bromo-2,4-dimethyl-6-ethylbenzene are dissolved in 74 parts of 96% sulfuric acid at 15–20°. 2.2 parts of N-methylolhydroxyacetamide are added with stirring. The product is worked up as described in Example 1. The dye obtained gives bright, level blue shades of good depth on wool; the fastness to light, washing, acid and alkaline milling is excellent, better than the fastness shown by dyeings of the sulfonation product of 1,4-di-(2',4'-dimethyl-6-ethyl)-phenylaminoanthraquinone.

EXAMPLE 3

5.3 parts of the condensation product of 1 mol of 1,4-diaminoanthraquinone and 2 mols of 1-bromo-2,4-diethylbenzene are dissolved in 74 parts of 96% sulfuric acid at 15–20°. 2.2 parts of N-methylolhydroxyacetamide are added with vigorous stirring. The product is worked up as described in Example 1 to give a dye for wool. The dyeings are of green shade, bright, level and of good depth, with very good light fastness, excellent acid and alkaline milling fastness, and good perspiration and washing fastness.

EXAMPLE 4

4.7 parts of the condensation product of 1 mol of 1,4-diaminoanthraquinone and 2 mols of 1-bromo-2,4,6-trimethylbenzene are dissolved in 74 part of 96% sulfuric acid at 20°. 1.4 parts of N-methylolhydroxyacetamide are added at 10–15° with vigorous stirring. The mixture is stirred for 24 hours at 15–20° and then run into ice. It is worked up into a dye in the way described in Example 1.

EXAMPLE 5

3.5 parts of 1-amino-4-(2',4',6'-trimethyl)-phenylaminoanthraquinone are dissolved in 74 parts of 96% sulfuric acid at 20°. 1.1 parts of N-methylol hydroxyacetamide are added at 10–15° with vigorous stirring. The mixture is stirred for 24 hours at 15–20° and then run into ice. The product is worked up as described in Example 1, the dye being obtained as a blue-violet powder. It dyes wool in full blue-violet shades of very good fastness to washing and to acid and alkaline milling.

DYEING EXAMPLE (EXAMPLE 6)

A dyebath is prepared with 10,000 parts of water, 2 parts of the dye of Example 1, 10 parts of Glauber's salt and 2 parts of glacial acetic acid. 100 parts of wool fabric are entered at 40–45°, the bath brought to the boil in 30 minutes and maintained at the boil for a further 30 minutes. Another 2 parts of glacial acetic acid are added and dyeing completed in another 30 minutes at the boil. The wool is removed, rinsed and dried. It is dyed in a full, level blue shade of very good washing and acid and alkaline milling fastness while the fastness to light, water, sea water, perspiration and crocking is excellent.

In the following Table A further dyes are set forth which are obtainable according to the particulars given in Examples 1 to 5. They correspond to the formula

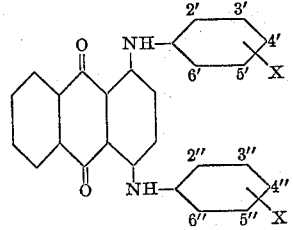

wherein the figures indicate the positions of the various substituents and X represents the grouping $$-CH_2-NH-OC-CH_2-O-SO_3H-$$

and is present at least once in each molecule of the dye.

Table A

| Example No. | 2' | 3' | 4' | 5' | 6' | 2'' | 3'' | 4'' | 5'' | 6'' | Shade of dyeing on wool |
|---|---|---|---|---|---|---|---|---|---|---|---|
| 6 | CH₃ | X | C₂H₅ | H | C₂H₅ | CH₃ | X | C₂H₅ | H | C₂H₅ | Blue. |
| 7 | C₂H₅ | X | C₂H₅ | H | H | C₂H₅ | C₂H₅ | C₂H₅ | H | C₂H₅ | Do. |
| 8 | CH₃ | X | H | CH₃ | CH₃ | CH₃ | CH₃ | X | CH₃ | H | Green. |
| 9 | CH₃ | X | H | H | H | CH₃ | CH₃ | X | H | H | Do. |
| 10 | CH₃ | X | C₂H₅ | H | CH₃ | CH₃ | CH₃ | X | C₂H₅ | CH₃ | Blue. |
| 11 | Br | CH₃ | H | C₂H₅ | X | CH₃ | CH₃ | CH₃ | C₂H₅ | CH₃ | Blue-red. |
| 12 | CH₃ | CH₃ | X | H | CH₃ | C₂H₅ | CH₃ | X | CH₃ | C₂H₅ | Blue. |
| 13 | CH₃ | X | CH₃ | H | H | C₂H₅ | CH₃ | CH₃ | C₂H₅ | C₂H₅ | Do. |
| 14 | CH₃ | X | C₃H₇ | H | H | C₂H₅ | CH₃ | X | C₃H₇ | C₂H₅ | Do. |
| 15 | CH₃ | X | C₂H₅ | H | H | C₂H₅ | CH₃ | H | C₂H₅ | C₂H₅ | Do. |
| 16 | C₂H₅ | X | C₂H₅ | H | H | C₂H₅ | CH₃ | H | C₂H₅ | C₂H₅ | Do. |
| 17 | CH₃ | X | CH₃ | H | H | C₂H₅ | CH₃ | H | H | C₂H₅ | Do. |
| 18 | C₂H₅ | X | H | H | CH₃ | CH₃ | C₂H₅ | H | CH₃ | H | Green. |
| 19 | CH₃ | X | H | CH₃ | H | H | CH₃ | CH₃ | H | H | Do. |
| 20 | CH₃ | X | H | H | CH₃ | H | CH₃ | H | H | CH₃ | Blue. |
| 21 | CH₃ | X | C₂H₅ | H | X | CH₃ | CH₃ | C₂H₅ | H | CH₃ | Blue-red. |
| 22 | Br | H | CH₃ | CH₃ | H | CH₃ | Br | CH₃ | CH₃ | CH₃ | Blue. |
| 23 | CH₃ | CH₃ | X | H | CH₃ | CH₃ | CH₃ | X | CH₃ | C₂H₅ | Do. |
| 24 | CH₃ | X | C₃H₇ | H | H | C₂H₅ | CH₃ | X | C₃H₇ | Br | Blue-red. |
| 25 | CH₃ | X | C₄H₉ | H | CH₃ | Br | CH₃ | H | C₄H₉ | Br | Do. |
| 26 | CH₃ | X | C₄H₉ | H | H | CH₃ | CH₃ | X | C₄H₉ | CH₃ | Blue. |
| 27 | CH₃ | X | C₄H₉ | H | CH₃ | CH₃ | CH₃ | H | C₄H₉ | CH₃ | Do. |
| 28 | CH₃ | X | C₄H₉ | H | | | | | C₄H₉ | | Do. |

In the following Table B are set forth further dyes which can be obtained according to the particulars given in Examples 1 to 5. They correspond to the formula

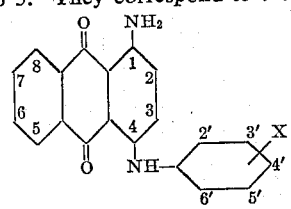

wherein the figures indicate the positions of the different substituents and X represents the grouping $$-CH_2-NH-OC-R-O-SO_3H-$$

(Formula I, supra).

Table B

| Example No. | 2' | 3' | 4' | 5' | 6' | 2 | 3 | 5 | 6 | 7 | 8 | Shade of dyeing on wool |
|---|---|---|---|---|---|---|---|---|---|---|---|---|
| 29 | Br | H | $CH_3$ | X | $CH_3$ | H | H | H | Cl | Cl | H | Violet. |
| 30 | $CH_3$ | X | $CH_3$ | H | $CH_3$ | H | H | H | Cl | Cl | H | Do. |
| 31 | $CH_3$ | X | $CH_3$ | H | $CH_3$ | H | H | OH | H | H | OH | Do. |
| 32 | $CH_3$ | X | $CH_3$ | H | $CH_3$ | $-SO_3H$ | H | H | H | H | H | Reddish blue. |
| 33 | $CH_3$ | H | X | H | $CH_3$ | $-SO_3H$ | H | H | H | H | H | Do. |
| 34 | $CH_3$ | X | $CH_3$ | H | $CH_3$ | $-OCH_3$ | H | H | H | H | H | Do. |
| 35 | $CH_3$ | X | H | $CH_3$ | $CH_3$ | $-CH_3$ | H | H | H | H | H | Violet. |
| 36 | $CH_3$ | X | $CH_3$ | H | $CH_3$ | $-OCH_2-CHOH-CH_2OH$ | H | H | H | H | H | Do. |
| 37 | $CH_3$ | X | $CH_3$ | H | $CH_3$ | $-O-\langle\text{phenyl}\rangle-C_5H_9$ | H | H | H | H | H | Bluish violet. |
| 38 | $CH_3$ | X | H | H | $CH_3$ | $-O-\langle\text{phenyl}\rangle-C_8H_{17}$ | H | H | H | H | H | Do. |
| 39 | $CH_3$ | X | $CH_3$ | H | H | Br | H | H | H | H | H | Violet. |
| 40 | $CH_3$ | X | $CH_3$ | H | $CH_3$ | $-SO_3H$ | H | H | $SO_3H$ | H | H | Blue. |
| 41 | $CH_3$ | X | H | H | $CH_3$ | $-SO_3H$ | H | H | H | H | H | Do. |
| 42 | $CH_3$ | $CH_3$ | X | $CH_3$ | $CH_3$ | H | H | H | $SO_3H$ | H | H | Violet. |
| 43 | $CH_3$ | X | $CH_3$ | $CH_3$ | $CH_3$ | $-CH_3$ | H | H | H | H | H | Do. |
| 44 | $CH_3$ | X | $CH_3$ | $SO_3H$ | $CH_3$ | $-OCH_3$ | H | H | H | H | H | Do. |
| 45 | $CH_3$ | X | $CH_3$ | $SO_3H$ | $CH_3$ | $\langle\text{cyclohexyl}\rangle-C_5H_9$ (with $SO_3H$) | H | H | H | H | H | Do. |

In the following Table C are set forth further dyes which can be obtained according to the particulars given in Examples 1 to 5. They are correspond to the formula

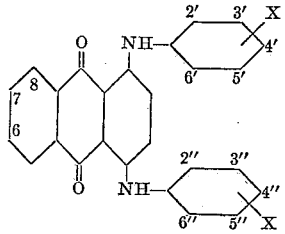

wherein the figures indicate the positions of the different substituents and X represents the grouping $$-CH_2-NH-OC-CH_2-O-SO_3H$$

and is present at least once in each molecule of the dye.

EXAMPLE 9

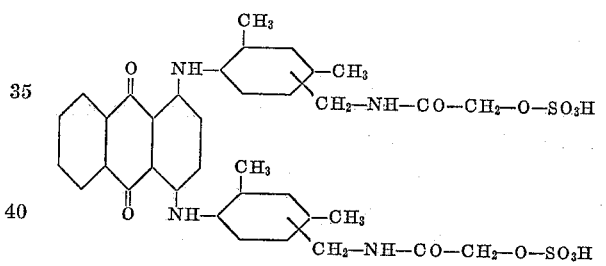

Table C

| Example No. | 2' | 3' | 4' | 5' | 6' | 2'' | 3'' | 4'' | 5'' | 6'' | 2 | 3 | 5 | 6 | 7 | 8 | Shade of dyeing on wool |
|---|---|---|---|---|---|---|---|---|---|---|---|---|---|---|---|---|---|
| 46 | $CH_3$ | X | $CH_3$ | H | $CH_3$ | $CH_3$ | X | $CH_3$ | H | $CH_3$ | H | H | H | Cl | Cl | H | Greenish blue. |
| 47 | $CH_3$ | X | $CH_3$ | H | $CH_3$ | $CH_3$ | X | $CH_3$ | H | $CH_3$ | H | H | OH | H | H | OH | Blue-green. |
| 48 | Br | H | $CH_3$ | X | $CH_3$ | Br | H | $CH_3$ | X | $CH_3$ | H | H | H | Cl | Cl | H | Blue. |
| 49 | $CH_3$ | X | H | H | $CH_3$ | $CH_3$ | X | H | H | $CH_3$ | H | H | H | Cl | Cl | H | Greenish blue. |
| 50 | $CH_3$ | X | H | H | $CH_3$ | $CH_3$ | X | H | H | $CH_3$ | H | H | H | Cl | Cl | H | Do. |
| 51 | $CH_3$ | X | $CH_3$ | H | $CH_3$ | $CH_3$ | X | $CH_3$ | H | $CH_3$ | H | H | H | Cl | Cl | H | Do. |
| 52 | Br | H | $CH_3$ | X | $CH_3$ | Br | H | $CH_3$ | X | $CH_3$ | H | H | H | Cl | Cl | H | Blue. |
| 53 | $CH_3$ | X | $CH_3$ | $SO_3H$ | $CH_3$ | $CH_3$ | X | $CH_3$ | $SO_3H$ | $CH_3$ | H | H | H | H | H | H | Do. |
| 54 | $CH_3$ | X | $CH_3$ | $SO_3H$ | $CH_3$ | $CH_3$ | X | $CH_3$ | $SO_3H$ | $CH_3$ | H | H | H | H | H | H | Do. |
| 55 | $CH_3$ | X | $C_2H_5$ | $SO_3H$ | $C_2H_5$ | $CH_3$ | X | $C_2H_5$ | $SO_3H$ | $C_2H_5$ | H | H | H | H | H | H | Do. |
| 56 | $C_2H_5$ | X | $C_2H_5$ | $SO_3H$ | $C_2H_5$ | $C_2H_5$ | X | $C_2H_5$ | $SO_3H$ | $C_2H_5$ | H | H | H | H | H | H | Do. |
| 57 | $CH_3$ | X | $C_4H_9$ | $SO_3H$ | $CH_3$ | $CH_3$ | X | $C_4H_9$ | $SO_3H$ | $CH_3$ | H | H | H | H | H | H | Do. |

Formulae of representative dyes of the foregoing examples are as follows:

EXAMPLE 6

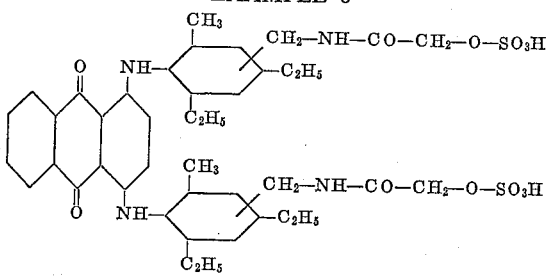

EXAMPLE 11

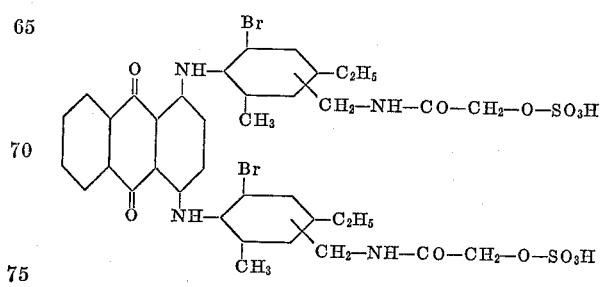

EXAMPLE 43

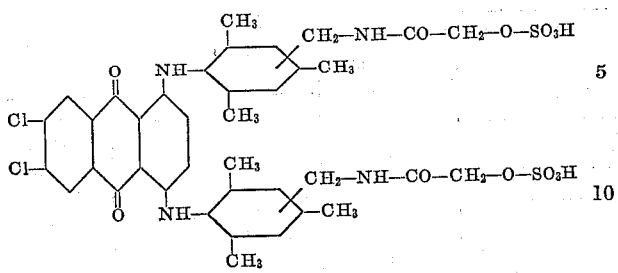

EXAMPLE 44

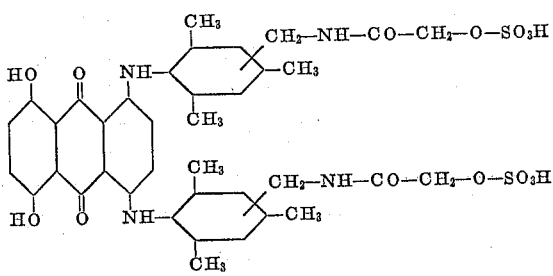

Having thus disclosed the invention what we claim is:
1. An anthraquinone dye of the formula

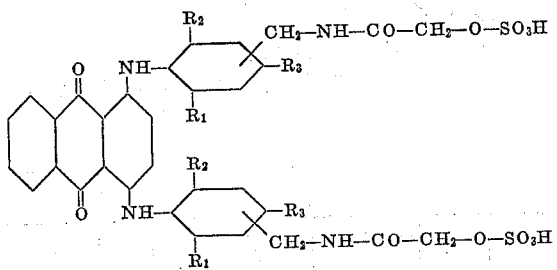

wherein
$R_1$ represents a member selected from the group consisting of methyl and ethyl,
$R_2$ represents a member selected from the group consisting of methyl and ethyl, and
$R_3$ represents a member selected from the group consisting of hydrogen, methyl and ethyl.

2. The anthraquinone dye of the formula

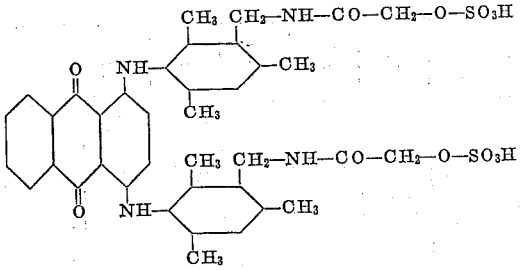

3. The anthraquinone dye of the formula

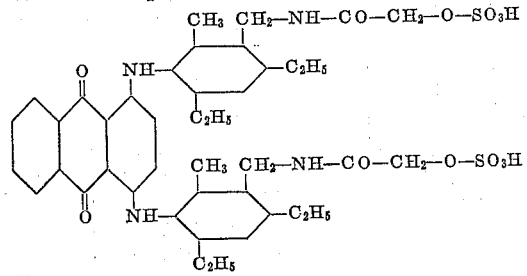

4. The anthraquinone dye of the formula

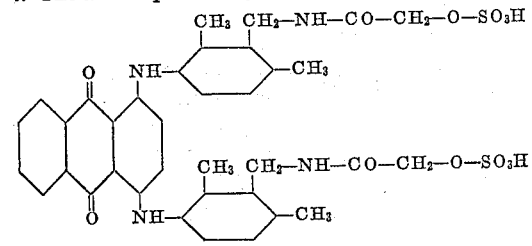

References Cited by the Examiner

UNITED STATES PATENTS

| | | | |
|---|---|---|---|
| 2,226,909 | 12/40 | Peter | 260—381 XR |
| 2,236,672 | 4/41 | Coffey et al. | 260—381 XR |
| 2,245,780 | 6/41 | Heinrich | 260—377 XR |
| 2,335,680 | 11/43 | Klein | 260—377 |
| 2,419,405 | 4/47 | Klein | 260—377 XR |
| 2,427,527 | 9/47 | Gutzwiller | 260—374 |
| 2,677,694 | 5/54 | Randall et al. | 260—377 XR |
| 2,975,167 | 3/61 | Schwander | 260—199 |

FOREIGN PATENTS

| | | |
|---|---|---|
| 1,181,107 | 1/59 | France. |
| 1,217,738 | 12/59 | France. |

OTHER REFERENCES

Wegmann, J.: Textil-Praxis, October 1958, pp. 1056–1061.

LORRAINE A. WEINBERGER, *Primary Examiner.*

LEON ZITVER, *Examiner.*